United States Patent
Kim et al.

(10) Patent No.: US 11,822,746 B1
(45) Date of Patent: Nov. 21, 2023

(54) METHODS AND SYSTEMS FOR ADAPTIVE TOUCHSCREEN CONTROL

(71) Applicant: STMicroelectronics Asia Pacific Pte Ltd., Singapore (SG)

(72) Inventors: Min Sang Kim, Bakdal-dong (KR); Kien Beng Tan, Singapore (SG); Eng Jye Ng, Singapore (SG); Boon Loong Woo, Singapore (SG); Tong Tee Tan, Singapore (SG)

(73) Assignee: STMicroelectronics Asia Pacific Pte Ltd., Singapore (SG)

(*) Notice: Subject to any disclaimer, the term of this patent is extended or adjusted under 35 U.S.C. 154(b) by 0 days.

(21) Appl. No.: 17/870,980

(22) Filed: Jul. 22, 2022

(51) Int. Cl.
| | | |
|---|---|---|
| *G06F 3/041* | (2006.01) | |
| *G06F 3/044* | (2006.01) | |
| *G09G 3/3225* | (2016.01) | |

(52) U.S. Cl.
CPC ........ *G06F 3/04184* (2019.05); *G06F 3/0446* (2019.05); *G06F 3/04166* (2019.05); *G09G 3/3225* (2013.01); *G09G 2310/08* (2013.01); *G09G 2320/0247* (2013.01); *G09G 2354/00* (2013.01)

(58) Field of Classification Search
CPC ............. G06F 3/04184; G06F 3/04166; G06F 3/0446; G09G 3/3225; G09G 2310/08; G09G 2320/0247; G09G 2354/00
See application file for complete search history.

(56) References Cited

U.S. PATENT DOCUMENTS

| | | | | |
|---|---|---|---|---|
| 11,335,295 | B1* | 5/2022 | Hirakawa | ............. G09G 3/3677 |
| 2013/0069895 | A1* | 3/2013 | Lo | ........................ G06F 3/04184 |
| | | | | 345/173 |
| 2016/0373616 | A1* | 12/2016 | Ikeuchi | ...................... H04L 7/00 |
| 2017/0123552 | A1* | 5/2017 | Brunet | ................ G06F 3/04184 |
| 2018/0196553 | A1* | 7/2018 | Mayumi | .................. H04N 3/14 |

* cited by examiner

*Primary Examiner* — Hong Zhou
(74) *Attorney, Agent, or Firm* — Slater Matsil, LLP (57) ABSTRACT

A method for operating a display includes receiving a horizontal synchronization (HSYNC) signal from a display driver of the display, the HSYNC signal including a plurality of pulses; measuring a parameter of the HSYNC signal within a frame; and initiating a touch scan on a touch sensing panel of the display based on the measured parameter.

19 Claims, 6 Drawing Sheets

METHODS AND SYSTEMS FOR ADAPTIVE TOUCHSCREEN CONTROL

TECHNICAL FIELD

The present invention relates generally to systems and methods for operating displays, and in particular embodiments to systems and methods for controlling touchscreens.

BACKGROUND

Electronic devices that are designed for user interaction have historically utilized external input devices such as keyboards, key pads, and mice to capture user input. In recent years, there has been a push from the more traditional methods, as consumers prefer the convenience of portable devices that can support a more flexible lifestyle. To this end, there has been a rise in smaller, portable, hand-held electronic devices, such as mobile phones, tablets, gaming systems, etc. This has given rise to the popularity of touch screens and touch panel displays as systems for capturing user input. Not only do they provide the functionality of the traditional electronic devices, but touchscreens provide additional features. For example, given the appropriate software, users are able to utilize touchscreens for sketching, drawing, and various hand writing applications. Today's display technologies such as organic light emitting diodes (OLEDs) displays offer a higher performance display. With the increasing use of advanced displays, thinner displays that are flexible or even foldable are emerging as a way to increase the size of a display without increasing the size of the device.

Thinner touchscreen displays may come with their own disadvantages such as display flicker. A display panel of an OLED based touchscreen may include a plurality of pixels arranged in rows and columns across a display layer in a matrix like formation. Each pixel may include an OLED configured to generate light based on the current driven through it. Sensing scans to detect touch (also referred to as touch scans) on the touchscreen may cause noticeable display flicker because signals generated during the touch scans may interfere with control and data signals for the display layer. Therefore, techniques to solve the display flicker issue are desired.

SUMMARY

In accordance with an embodiment, a method for operating a display includes receiving a horizontal synchronization (HSYNC) signal from a display driver of the display, the HSYNC signal including a plurality of pulses. The method further includes measuring a parameter of the HSYNC signal within a frame, and initiating a touch scan on a touch sensing panel of the display based on the measured parameter.

In accordance with an embodiment, a circuit for controlling a display includes a processor and a pulse measurement circuit coupled to the processor. The pulse measurement circuit is configured to measure a parameter of a horizontal synchronization (HSYNC) signal within a frame. The HSYNC signal includes a plurality of pulses and being received from a display driver of the display. The circuit further includes a timer coupled to the processor. The timer is configured to initiate a touch scan on a touch sensing panel of the display based on the measured parameter.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

The making and using of various embodiments are discussed in detail below. It should be appreciated, however, that the various embodiments described herein are applicable in a wide variety of specific contexts. The specific embodiments discussed are merely illustrative of specific ways to make and use various embodiments, and should not be construed in a limited scope.

Reference to "an embodiment" or "one embodiment" in the framework of the present description is intended to indicate that a particular configuration, structure, or characteristic described in relation to the embodiment is included in at least one embodiment. Hence, phrases such as "in an embodiment" or "in one embodiment" that may be present in one or more points of the present description do not necessarily refer to one and the same embodiment. Moreover, particular conformations, structures, or characteristics may be combined in any adequate way in one or more embodiments. The references used herein are provided merely for convenience and hence do not define the extent of protection or the scope of the embodiments.

Integrated circuits have long incorporated embedded components that may lack externally accessible pins. These components, however, just like any other component, may be subject to performance variations for any variety of reasons such as, but not limited, manufacturing and other defects. The need for testing these embedded components, and systems of embedded components, on integrated circuits prompted the development of alternative approaches.

While organic light emitting diode (OLED) touchscreens have led to great advances in the evolution of portable devices, limitations still exist. Conventional OLED touchscreens may include a display array that includes a plurality of pixels arranged in rows and columns across a display layer in a matrix like formation. Each pixel may include an OLED configured to generate light based on the current driven through it. In operation, an OLED display may be refreshed (e.g., updated) in each of a plurality of display frames defined by a vertical synchronization signal (VSYNC). During each display frame, each row of pixels are updated sequentially according to a horizontal synchronization signal (HSYNC) signal and touch sensing scans (e.g., mutual and self-sensing scans) are performed. Problematically, however, touch sensing scans may cause interference to the display when they are performed while the display is updated. In such cases, especially as OLED touchscreens are becoming thinner, this may result in a dimming of the light illuminated by the OLEDs and result in noticeable display flicker.

Typically, to prevent flicker, touch sensing scans are performed during idle time in a display frame after the display is finished updating. This is accomplished by delaying the performance of touch sensing scans according to the VSYNC signal. To conserve power, OLED displays may be updated at variable speeds without changing the refresh rate. For example, the pulse period of the HSYNC signal may be changed, without changing the VSYNC. The active time and idle time of a frame may change in accordance with various pulse periods of the HSYNC signal. As such, touch sensing scan delayed by a time period based on the VSYNC signal may still occur during active time of a frame, which may cause display flicker. Therefore, techniques to solve the display flicker issue in variable refresh rate situations are desired.

Embodiments of the present application relate to preventing display flicker by performing touch sensing scans in accordance with the HSYNC signal. In an embodiment, a method for operating a display includes a touch controller of the display receiving an HSYNC signal from a display driver of the display during a frame. The method further includes the touch controller detecting a beginning pulse of the HSYNC signal within the frame and performing a touch scan on a touch screen panel of the display after an ending pulse of the HSYNC signal within the frame. In various embodiments, the method includes measuring a pulse period of the HSYNC signal and starting a timer upon detecting the beginning pulse, where a duration of the timer is longer than the pulse period multiplied by a total number of pulses in the HSYNC signal within the frame. The touch scan is performed upon detecting an expiration of the timer. Alternatively, the method includes performing the touch scan a time period after detecting the ending pulse of the HSYNC signal within the frame. The above aspects and other inventive aspects are discussed in greater detail below.

Figure 1:
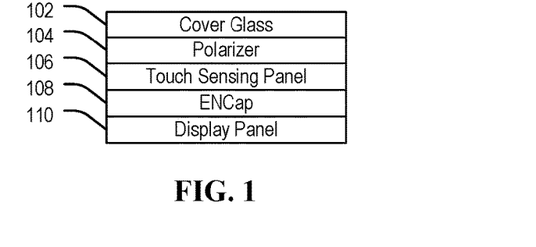
FIG. 1 illustrates a stack-up diagram of a conventional display.

FIG. 1 illustrates a stack-up diagram of a conventional display 100. The display 100 may be an organic light emitting diode (OLED) display or any other type of display integrated with a touch sensing function. The display 100 may also be referred to as a touchscreen, a touchscreen display or a touch display. The display 100 may include a stack-up of a plurality of different layers. As a non-limiting example, the display 100 may comprise a cover glass layer 102, a polarizer film layer 104, a touch sensing panel 106, an encapsulation film layer 108, and a display panel 110. The display panel no may comprise a plurality of pixel elements formed across rows and columns of the display 100 in an array like formation. The pixel elements may be OLED and may be configured to transmit light having a color (such as red, green, or blue) with a brightness based on the current they are driven with. The pixel elements may also be implemented based on non-OLED techniques. The encapsulation film layer 108 may be formed in direct contact with the display panel no. The encapsulation film 120 may function to prevent oxygen, water, or moisture from external sources reaching into and damaging the display panel no. The touch sensing panel 106 may be a capacitive touch panel configured to detect touches made on the display 100. The touch sensing panel 106 may include a plurality of touch sensing electrodes. The touch sensing electrodes may be deposited and attached onto the encapsulation film 120 (e.g., in an on-cell type display). Alternatively, the touch sensing electrodes may be printed or fabricated with the encapsulation film 120 (e.g., in an in-cell type display). The polarizer film layer 104 may be used for controlling the characteristics of the display 100 such as external light reflection, color accuracy, luminance, and so on. The cover glass layer 102 may be a protective layer to protect the display 100. The cover glass layer 102 may comprise a transparent material such as a thin layer of glass including silicon dioxide. Additional layers known in the art may also be included in the display 100.

Figure 2:
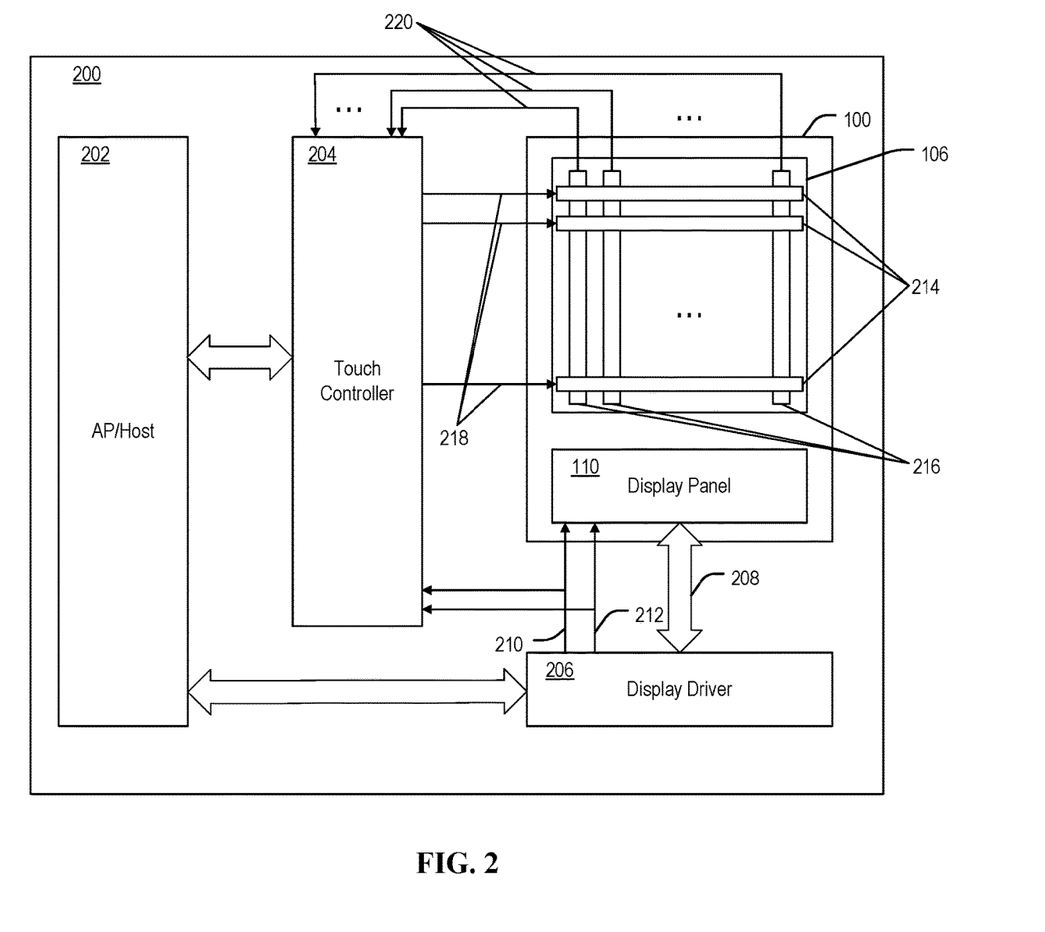
FIG. 2 is a block diagram of an electronic device according to some embodiments.

FIG. 2 is a block diagram of an electronic device 200 according to some embodiments. The electronic device 200 may include a display 100, a host 202, a touch controller 204, and a display driver 206. The electronic device 200 may be a smart phone, a Global Positioning System (GPS) device, a tablet computer, a mobile media player, a laptop, a gaming system, a personal computer, or any other electronic device that may utilize a touchscreen display (such as the display 100).

The host 202, also referred to as a system on a chip or an application processor (AP), comprises a processor, interface, circuitry, and the like configured to direct the flow of input and output data to the touch controller 204 and the display driver 206. For example, the host 202 may be the CPU of a smartphone. A memory may be coupled to or otherwise integrated with the host 202. The memory may be programmed for short term and/or long term memory storage. The memory may comprise various programs to be executed in the host 202. The memory may include both volatile and non-volatile memories. The host 202 may be configured to, e.g., transmit image data, updated display refresh rates, and/or synchronization signals to the display driver 206 and to receive touch coordinates from the touch controller 204.

The display 100 may include a touch sensing panel 106 and a display panel 110. The display panel no is configured to display an image in accordance with display signals 208 and synchronization signals (including a VSYNC signal 210 and an HSYNC signal 212) received from the display driver 206. The display driver 206 may perform various methods with respect to the display 100. In various embodiments, the display driver 206 may be a processor that analyzes information and carries out a series of executable scripts, e.g., stored in a memory integrated in the display driver 206. Alternatively, the display driver 206 and the touch controller 204 may share a common memory. In one or more embodiments, the processor may comprise an application-specific integrated circuit (ASIC) device, a central processing unit (CPU), or any other processing unit known in the art. In various embodiments, the display driver 206 may refresh an image displayed on the display 100 based on a display refresh rate and/or synchronization signals received from the host 202. The display driver 206 may transmit the VSYNC signal 210 and the HSYNC signal 212 to the touch controller 204.

The touch sensing panel 106 in the display 100 is configured to detect touches made on the display 100. The touch sensing panel 106 may include transmitting (TX) electrodes 214 and receiving (RX) electrodes 216. The TX electrodes 214 and RX electrodes 216 may span the entirety of the display 100 in a grid-like fashion that are operable by the touch controller 204. In various embodiments, the TX electrodes 214 may be formed in rows across the display 100 and the RX electrodes 216 may be formed in columns across the display 100. In other embodiments, the RX electrodes 216 may be formed in columns across the display 100 and the TX electrodes 214 may be formed in rows across the display 100. In various embodiments, the number of the TX electrodes 214 may be equal to the number of the RX electrodes 216. The TX electrodes 214 and the RX electrodes 216 may overlap in certain embodiments. While FIG. 2 depicts the TX electrodes 214 and the RX electrodes 216 overlapping in an orthogonal manner, they may overlap other than orthogonally such as being interleaved or at various angles.

The TX electrodes 214 and the RX electrodes 216 may be operable in a mutual sensing mode and a self-sensing mode. As appreciated by those with ordinary skill in the art, each of the TX electrodes 214 and the RX electrodes 216 may have a self-capacitance that is measurable. In addition, the TX electrodes 214 and the RX electrodes 216 may have a measurable mutual capacitance at each of their intersections as to form an array of mutual capacitors. In various embodiments, the TX electrodes 214 and the RX electrodes 216 may be coupled to the touch controller 204. Alternatively, the display driver 206 is coupled between the TX electrodes 214 and the touch controller 204, while the RX electrodes 216 are coupled to the touch controller 204.

The touch controller 204 may perform various methods with respect to the display 100. In various embodiments, the touch controller 204 may be a processor that analyzes information and carries out a series of executable scripts, e.g., stored in a memory integrated in the touch controller 204. For example, the memory may include non-transitory memory such as read-only memory (ROM) storing firmware or random access memory (RAM). In one or more embodiments, the processor may comprise an application-specific integrated circuit (ASIC) device, a central processing unit (CPU), or any other processing unit known in the art. In various embodiments, the touch controller 204 may comprise a number of separate computing units such as cores integrated within one processor, or distinct separate processing chips.

During a touch sensing operation or a touch scan operation, the touch controller 204 may transmit touch driving signals (TDS) 218 to the TX electrodes 214 of the touch sensing panel 106 and receive touch sensing signal (TSS) 220 from the RX electrodes 216 of the touch sensing panel 106. If an object, such as a finger, is in close proximity to an intersection of one TX electrode 214 and one RX electrode 216, the TSS 220 will be changed. The touch controller 204 may measure and analyze the TSS 220, and then report touch coordinates to the host 202.

Flicker may be induced by the touch sensing scans initiated by the touch controller 204 to detect touch on the display 100. Specifically, when the touch sensing scans are performed on the touch sensing panel 106 during the display updating, interference to the display panel no may occur. This may result in a reduced brightness of the display panel 110, resulting in noticeable flicker on the display 100 by a user.

Figure 3A:
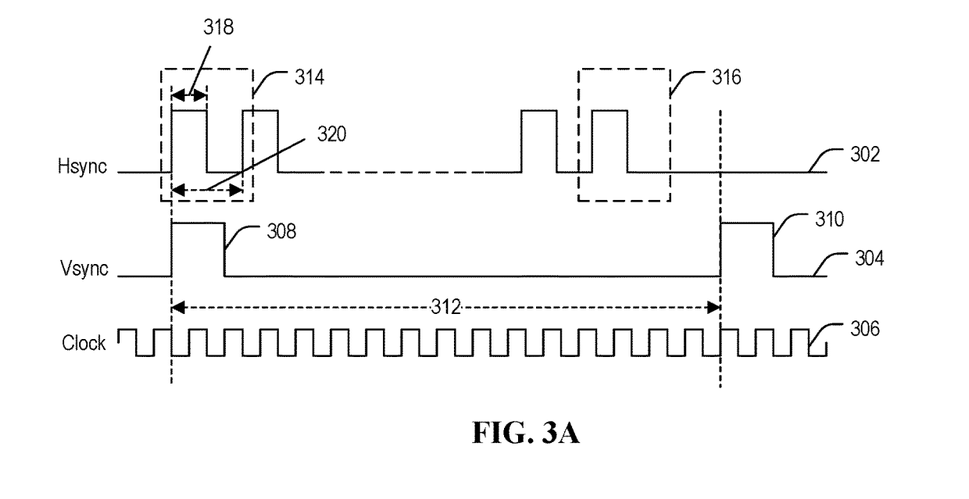
FIGS. 3A-3C are timing diagrams that depict flicker issues caused by a conventional touch scan.
Figure 3B:
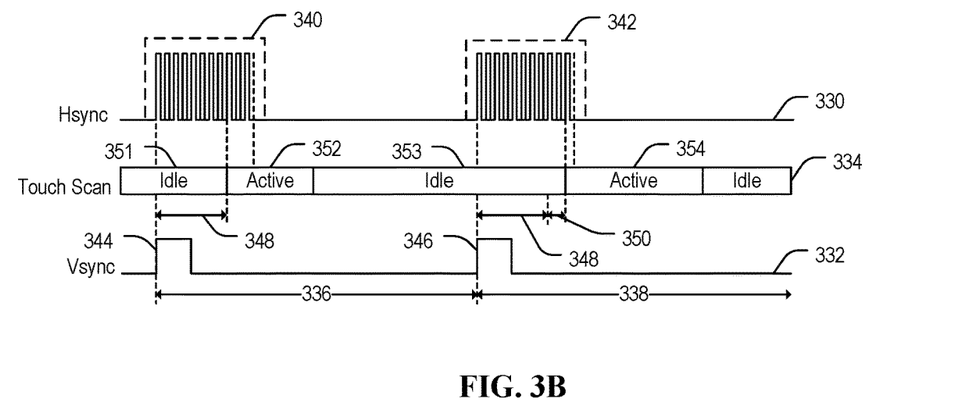
Figure 3C:
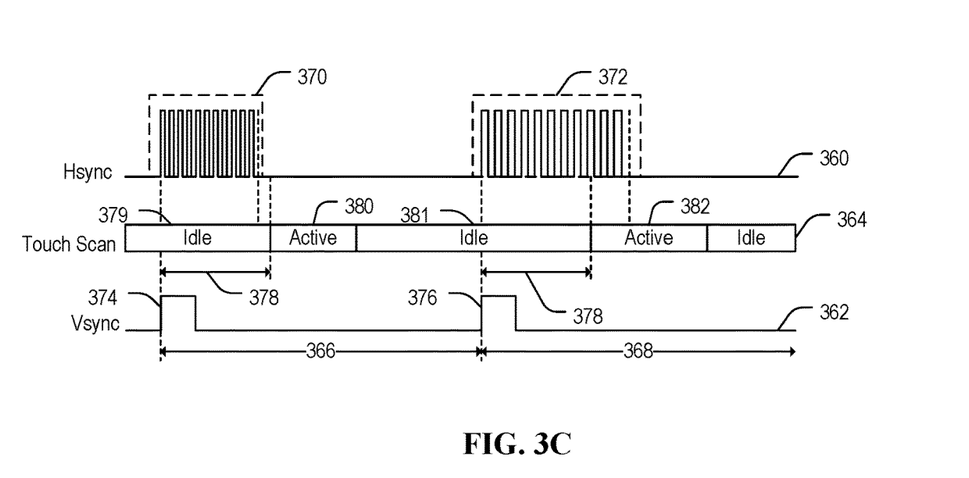

FIGS. 3A-3C depict flicker issues caused by a conventional touch scan. FIG. 3A illustrates a timing diagram showing the relationship between an HSYNC signal 302, a VSYNC signal 304, and a clock signal 306. Both the VSYNC signal 304 and the HSYNC signal 302 may include a plurality of pulses. Each pulse of the VSYNC signal 304 may represent a new frame of the display. In the example illustrated by FIG. 3A, a frame 312 is located between a rising edge of a VSYNC pulse 308 and a rising edge of a subsequent VSYNC pulse 310 (assuming that the active edge of both VSYNC and HSYNC is the rising edge). A plurality of HSYNC pulses may occur during each frame. Each pulse of the HSYNC signal 302 may represent a new horizontal line of a frame. The total number of HSYNC pulses per frame may depend on the resolution of the display. An HSYNC pulse 314 is a beginning pulse (the first pulse) in the HSYNC signal 302 within the frame 312. An HSYNC pulse 316 is an ending pulse (the last pulse) in the HSYNC signal 302 within the frame 312. A time period 320 between a rising edge of an HSYNC pulse and a rising edge of a subsequent HSYNC pulse is a pulse period of the HSYNC signal 302. A time period 318 between a rising edge and a falling edge of the same HSYNC pulse is a pulse width of the HSYNC signal 302. A duty cycle of a pulse is defined as a pulse width divided by a pulse period. For example, in FIG. 3A, the pulse width of the HSYNC signal 302 is one clock, the pulse period of the HSYNC signal 302 is two clocks, and the duty cycle of the HSYNC signal 302 is 50%. Various pulse periods and duty cycles may be used in an HSYNC signal.

In one embodiment, the pulse period of an HSYNC signal is fixed, which is referred to as a fixed rate HSYNC signal. In another embodiment, the pulse period of an HSYNC signal is variable, which is referred to as a variable rate HSYNC signal. An electronic device may use the variable rate HSYNC signal to save power consumption. For example, a mobile phone may have a high speed display mode and a normal speed display mode. In the high speed display mode, a shorter HSYNC pulse period is applied, which may result in different power consumption. The electronic device may use different HSYNC signals in different frames.

In order to mitigate the display flicker issue, a conventional display usually relies on a VSYNC signal to determine the timing of touch scans. The conventional display may try to avoid conflict between touch scan operations and display updating during HSYNC pulses by deferring the touch scan operations upon detecting a pulse in the VSYNC signal. The deferral period may be a fixed or predetermined duration. Alternatively, the deferral period may be a random duration to avoid any obvious interference patterns showing on the display. As illustrated below, this method may not guarantee elimination of the flicker issues due to lack of the knowledge of an HSYNC signal.

FIG. 3B illustrates flicker issues caused by a conventional touch scan for a fixed rate HSYNC signal. A VSYNC signal 332 has two pulses 344 and 346. A rising edge of the VSYNC pulse 344 represents beginning of a frame 336, and a rising edge of the VSYNC pulse 346 represents beginning of a frame 338. An HSYNC signal 330 has multiple pulses 340 within the frame 336 and multiple pulses 342 within the frame 338. The HSYNC pulses 340 and the HSYNC pulses 342 have the same number of pulses, and each pulse has the same pulse period. In other words, the HSYNC signal 330 is a fixed rate HSYNC signal. The HSYNC pulses correspond to when a display is being updated. Blocks 334 denote status of touch scan operations. Blocks 351 and 353 correspond to when the touch scan operations are idle (i.e., no touch scan occurs during this period). Blocks 352 and 354 correspond to when the touch scan operations are active (i.e., touch scan are performed during this period). As shown in FIG. 3B, in the frame 336, the touch scan operations 352 are delayed by a fixed period 348 upon detection of the VSYNC pulse 344. In the frame 338, the touch scan operations 354 are delayed by the fixed delay 348 plus a random period 350 upon detection of the VSYNC pulse 346. However, even though deferral periods are applied, the touch scan operations 352 and 354 still overlap with the HSYNC pulses 340 and 342 respectively in the time domain. Thus, without knowledge of the HSYNC signal, a conventional display may not eliminate the flicker issue simply by deferring touch scans in accordance with the VSYNC signal because an appropriate deferral period is difficult to choose.

FIG. 3C illustrates flicker issues caused by a conventional touch scan for a variable rate HSYNC signal. A VSYNC signal 362 has two pulses 374 and 376. A rising edge of the VSYNC pulse 374 represents beginning of a frame 366, and a rising edge of the VSYNC pulse 376 represents beginning of a frame 368. An HSYNC signal 360 has multiple pulses 370 within the frame 366 and multiple pulses 372 within the frame 368. The HSYNC pulses 370 and the HSYNC pulses 372 have the same number of pulses but different pulse period. In other words, the HSYNC signal 360 is a variable rate HSYNC signal. A display that uses the HSYNC signal 360 may operate in a high speed mode using a smaller HSYNC pulse period during the frame 366, and then may switch to a normal or low speed mode using a larger HSYNC pulse period during the frame 368. Blocks 364 denote status of touch scan operations. Blocks 379 and 381 correspond to when the touch scan operations are idle (i.e., no touch scan occurs during this period). Blocks 380 and 382 correspond to when the touch scan operations are active (i.e., touch scan are performed during this period). As shown in FIG. 3C, in the frame 366, the touch scan operations 380 are deferred by a period 378 upon detection of the VSYNC pulse 374. The period 378 is long enough so that the touch scan operations 380 do not conflict with the HSYNC pulses 370. Thus, flicker issues may be avoided in the frame 366. In the frame 368, the same deferral period 378 is applied to the touch scan operations 382. However, the touch scan operations 382 still conflict with the HSYNC pulses 372 because the HSYNC pulse period in this frame is larger. Thus, a conventional display may not eliminate the flicker issue simply by deferring touch scans in accordance with the VSYNC signal because such a method may not apply to situations with a variable rate HSYNC signal.

In various embodiments of the present disclosure, the timing of a touch scan is determined in accordance with an HSYNC signal. Specifically, the touch scan on a touch sensing panel of a display is performed after an ending pulse of the HSYNC signal within the frame.

Figure 4:
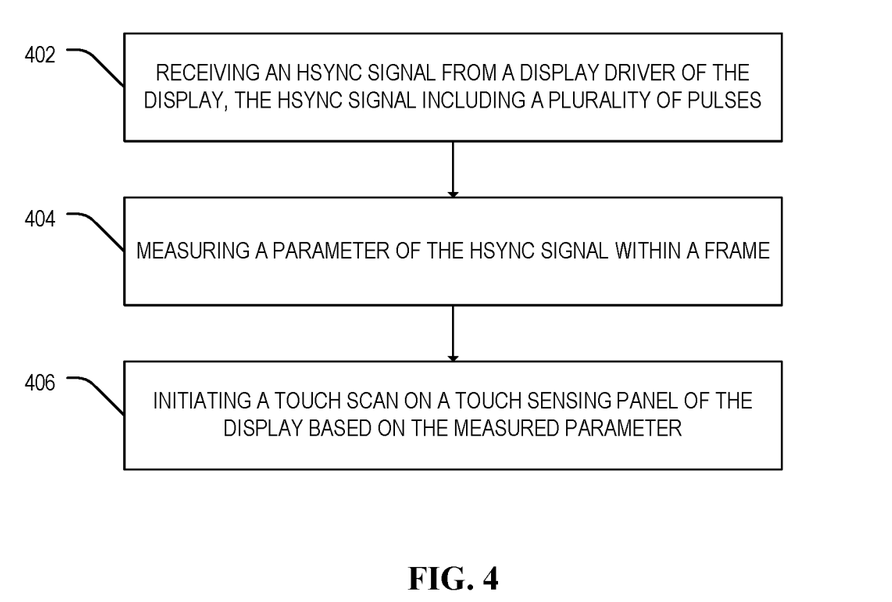
FIG. 4 depicts a method for operating a display according to some embodiments.

FIG. 4 depicts a method 400 for operating a display according to some embodiments. The method 400 begins at step 402, where a circuit receives an HSYNC signal from a display driver of the display, the HSYNC signal including a plurality of pulses. The method 400 proceeds to step 404, where the circuit measures a parameter of the HSYNC signal within a frame. The method 400 then proceeds to step 406, where the circuit initiates a touch scan on a touch sensing panel of the display based on the measured parameter. In an embodiment, the circuit may be a touch controller of the display. In another embodiment, the circuit may be located within the touch controller. In yet another embodiment, the circuit may be an external circuit coupled to the touch controller.

Figure 5:
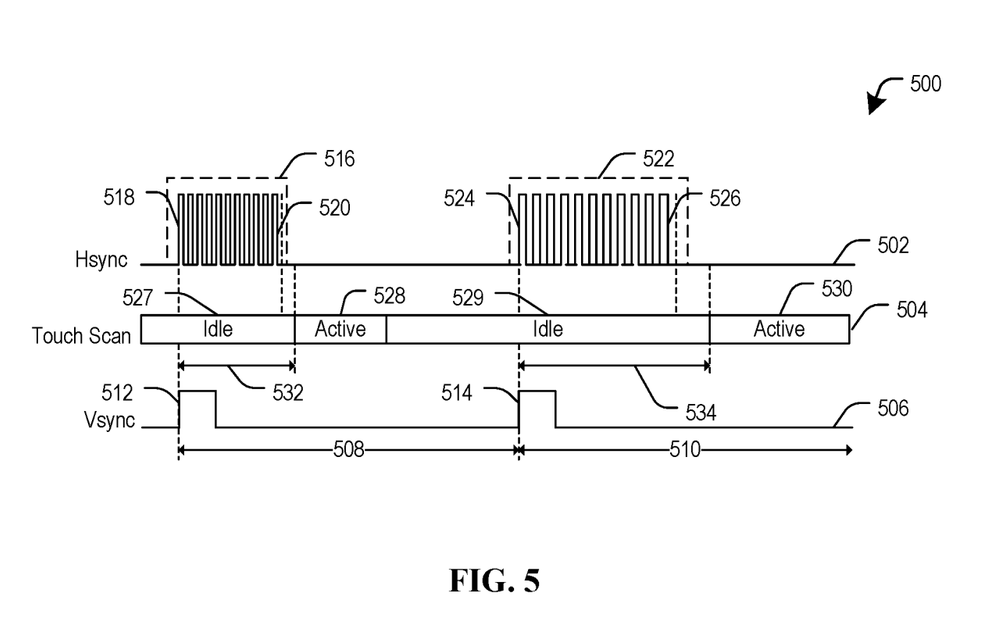
FIG. 5 illustrates a timing diagram of the proposed method according to some embodiments.

In various embodiments, the circuit initiates the touch scan after determining that an ending pulse of the HSYNC signal has occurred. FIG. 5 illustrates a timing diagram 500 of the proposed method according to some embodiments. The timing diagram 500 includes a VSYNC signal 506, an HSYNC signal 502, and touch scan status blocks 504. The VSYNC signal 506 has two pulses 512 and 514. A rising edge of the VSYNC pulse 512 represents beginning of a frame 508, and a rising edge of the VSYNC pulse 514 represents beginning of a frame 510. The HSYNC signal 502 has multiple pulses 516 within the frame 508 and multiple pulses 522 within the frame 510. The multiple pulses 516 include a beginning pulse (the first HSYNC pulse in the frame 508) 518 and an ending pulse (the last HSYNC pulse in the frame 508) 520. The multiple pulses 522 include a beginning pulse (the first HSYNC pulse in the frame 510) 524 and an ending pulse (the last HSYNC pulse in the frame 510) 526. The HSYNC pulses 516 and the HSYNC pulses 522 have the same number of pulses but different pulse period. In other words, the HSYNC signal 502 is a variable rate HSYNC signal. A display that uses the HSYNC signal 502 may operate in a high speed mode using a smaller HSYNC pulse period during the frame 508, and then may switch to a normal or low speed mode using a larger HSYNC pulse period during the frame 510. Blocks 504 denote status of touch scan operations. Blocks 527 and 529 correspond to when the touch scan operations are idle (i.e., no touch scan occurs during this period). Blocks 528 and 530 correspond to when the touch scan operations are active (i.e., touch scan are performed during this period).

As shown in FIG. 5, in the frame 508, the touch scan operations 528 are performed after the ending HSYNC pulse 520 within this frame. Thus, flicker issues are avoided in the frame 508. In the frame 510, the touch scan operations 530 are performed after the ending HSYNC pulse 526 within this frame. Thus, flicker issues also are avoided in the frame 510. Therefore, with knowledge of an HSYNC signal, the proposed method solves the flicker issue by deferring touch scans in a frame in accordance with the HSYNC signal so that a touch scan is performed after an ending HSYNC pulse during the frame.

Figure 6:
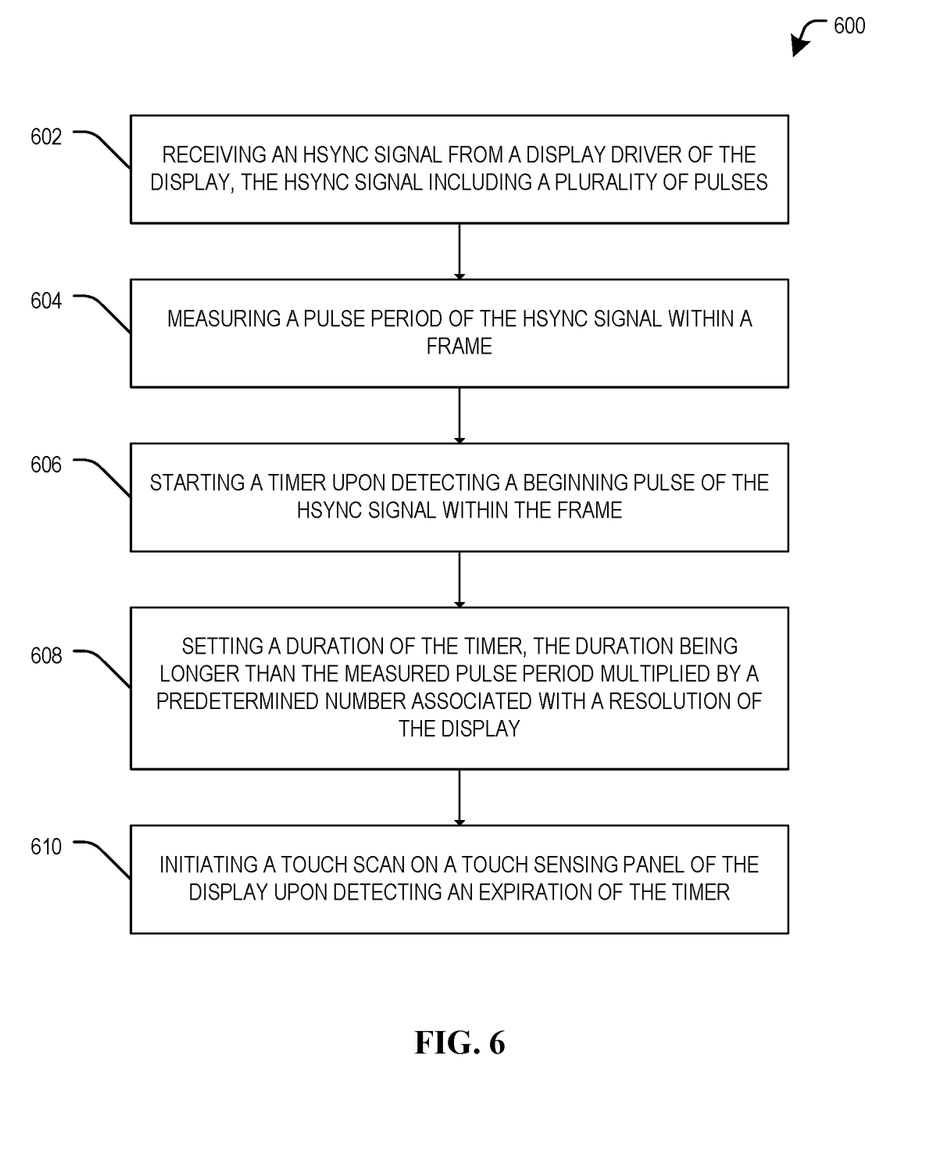
FIG. 6 is a method for operating a display based on measuring horizontal synchronization (HSYNC) pulse period according to some embodiments.

In various embodiments, the parameter of the HSYNC signal to be measured at step 404 is a pulse period of the HSYNC signal within a frame. FIG. 6 is a method 600 for operating a display based on HSYNC pulse period measurement according to some embodiments. The method 600 begins at step 602, where a circuit receives an HSYNC signal from a display driver of the display. The HSYNC signal may include a plurality of pulses.

At step 604, the circuit measures the pulse period of the HSYNC signal within a frame. The pulse period of the HSYNC signal within the frame is an interval between either rising edges of two consecutive pulses of the HSYNC signal or falling edges of the two consecutive pulses of the HSYNC signal within the frame. In a non-limiting example, the circuit may detect two consecutive pulses of the HSYNC signal within the frame. The circuit may determine the pulse period of the HSYNC signal by measuring an interval between rising edges of the two consecutive pulses. In another non-limiting example, the circuit may detect multiple (more than two) consecutive pulses of the HSYNC signal within the frame. The circuit may determine the pulse period of the HSYNC signal by measuring an average interval using the multiple measurements of the consecutive pulses. In one embodiment, the circuit may determine the pulse period by measuring an interval between a rising edge of an HSYNC pulse and a rising edge of a subsequent HSYNC pulse. In another embodiment, the circuit may determine the pulse period by measuring an interval between a falling edge of an HSYNC pulse and a falling edge of a subsequent HSYNC pulse. In yet another embodiment, the circuit may determine the pulse period by first measuring a pulse width of an HSYNC pulse and then determine the pulse period based on the measured pulse width and a duty cycle. The circuit may determine the pulse width by measure an interval between the rising edge and the falling edge of the HSYNC pulse. Alternatively, timing measurement of the HSYNC signal may be made by measuring a time period between any two edges of any of the pulses of the HSYNC signal.

At step 606, the circuit starts a timer upon detecting a beginning pulse of the HSYNC signal within the frame. At step 608, the circuit sets a duration of the timer. The duration of the timer may be longer than the measured pulse period multiplied by a total number of pulses in the HSYNC signal within the frame. The total number of pulses may be a predetermined value. In one embodiment, the circuit may calculate the duration in real time based on the pulse period and the total number of pulses in the HSYNC signal within the frame. The total number of pulses in the HSYNC signal within a frame may depend on specifications of the display, such as a resolution of the display. The total number of pulses in the HSYNC signal within a frame may or may not change while the display is operating. The circuit may have knowledge of the total number of the pulses in the HSYNC signal according to a predetermined configuration. Alternatively, the circuit may receive information about the total number of pulses in the HSYNC signal within a frame from some other parts of the display such as an AP or a display driver. In another embodiment, the circuit may have a plurality of predetermined values stored in its memory. The circuit may select one of these stored values as the duration of the timer in accordance with the measured pulse period of the HSYNC signal. In various embodiments, the circuit may first determine an operation mode of the display based on the pulse period. For example, the operation mode may be a high speed mode or a normal speed mode, and each mode is associated with a predetermined value. Then the circuit may select one predetermined value associated with the operation mode as the duration of the timer.

At step 610, the circuit initiates a touch scan on a touch sensing panel of the display upon detecting an expiration of the timer.

Figure 7:
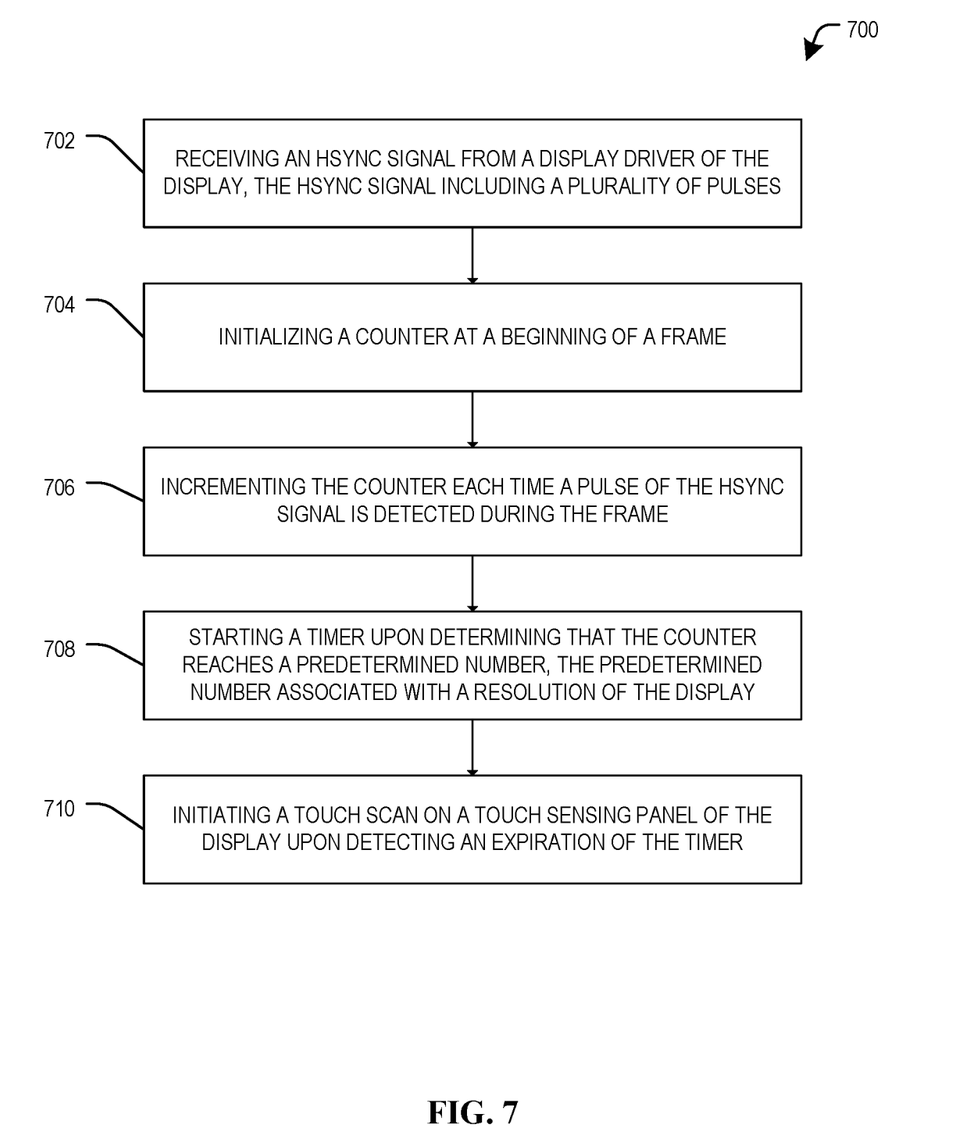
FIG. 7 is a method for operating a display based on counting HSYNC pulses according to some embodiments.

In various embodiments, the parameter of the HSYNC signal to be measured at step 404 is a number of pulses in the HSYNC signal within a frame. FIG. 7 is a method 700 for operating a display based on counting HSYNC pulses according to some embodiments. The method 700 begins at step 702, where a circuit receives an HSYNC signal from a display driver of the display. The HSYNC signal may include a plurality of pulses. At step 704, the circuit initializes a counter at a beginning of the frame. In one embodiment, the beginning of the frame may be determined based on detection of a pulse of a VSYNC signal. In another embodiment, the beginning of the frame may be determined based detection of a beginning pulse of the HSYNC signal.

At step 706, the circuit increments the counter each time a pulse of the HSYNC signal is detected during the frame. At step 708, the circuit starts a timer upon determining that the counter reaches a predetermined number. The predetermined number may be a total number of pulses of the HSYNC signal within the frame. The total number of pulses of the HSYNC signal within a frame may be associated with a resolution of the display. The total number of pulses of the HSYNC signal within a frame may be determined in ways similar to those discussed above. At step 710, the circuit initiates a touch scan on a touch sensing panel of the display upon detecting an expiration of the timer.

In various embodiments, the parameter may be measured by a pulse measurement circuit. The pulse measurement circuit may include a counter and an edge detection circuit coupled together. The edge detection circuit may be further coupled to a high frequency clock. The pulse measurement circuit may be configured to detect a pulse in the HSYNC signal. The pulse measurement circuit may also be configured to measure a pulse period of the HSYNC signal or measure a pulse width of the HSYNC signal, or both. In various embodiments, the pulse measurement circuit may detect a pulse of the HSYNC signal in accordance with either a rising edge or a falling edge, or both. In various embodiments, persons skilled in the art may implement the pulse measurement circuit using any suitable circuits or any suitable signal processing techniques known in the art.

Figure 8:
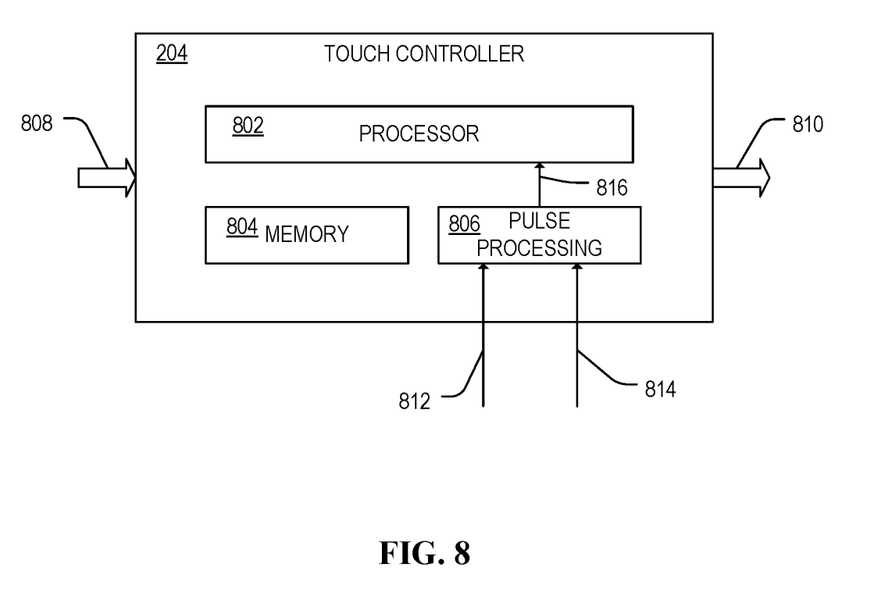
FIG. 8 is a block diagram of a touch controller according to some embodiments.

FIG. 8 is a block diagram of a touch controller 204 according to some embodiments. The touch controller may include a processor 802, a memory 804, and a pulse processing circuit 806. The processor 802 may be a microcontroller, an application-specific integrated circuit (ASIC) device, a central processing unit (CPU), or any other processing unit known in the art. The memory 804 may be a non-transitory memory such as read-only memory (ROM) storing firmware or a random access memory (RAM). The memory 804 may be located within the touch controller 204. Alternatively, the memory 804 may be located outside of the touch controller 204 and the touch controller 204 may share the memory 804 through an interface with one or more other processing units of the electronic device.

The pulse processing circuit 806 may be any circuit or hardware known in the art that is capable of pulse detection, pulse period measurement, and/or pulse width measurement. For example, in some embodiments, pulse processing circuit 806 may be implemented using a counter. The pulse processing circuit 806 may take inputs such as a VSYNC signal 812 or an HSYNC signal 814, perform pulse processing tasks as described in the present disclosure, and the report the processing results to the processor 802 using a signal 816. In one embodiment, the signal 816 may include the measured pulse period. In another embodiment, the signal 816 may be an interrupt service routine (ISR) or a service interrupt triggered by the pulse processing circuit 806. In one embodiment, the pulse processing circuit 806 may measure a pulse period of the HSYNC signal and transmit a service interrupt to the processor 802. The measured pulse period may be stored in a register of the pulse processing circuit 806. The service interrupt may trigger the process 802 to read the measured pulse period from the register of the pulse processing circuit 806. In another embodiment, the pulse processing circuit 806 may detect a pulse in the HSYNC signal 814, and then transmit a service interrupt to the processor 802 to notify the processor 802 that an HSYNC pulse has been detected. The processor 802 may act in response to the received service interrupt accordingly as described in the present disclosure.

The touch controller 204 may have inputs 808 and outputs 810. The inputs 808 may include signals the touch controller 204 receives from a host and a display. For example, the inputs 808 may include control signals from the host and touch sensing signal from the display. The outputs 810 may include signals the touch controller transmits to the host and the display. For example, the outputs 810 may include touch coordinates signals and touch driving signals.

In various embodiments, the touch controller 204 may include a clock circuit that is configured to generate a clock signal. The clock signal may be used to measure intervals between pulses of the HSYNC signal 814 and the VSYNC signal 812. Alternatively, a clock circuit may not be located within the touch controller 204, and the touch controller 204 may receive a clock signal from a host or AP or any other suitable part of the electronic device.

Figure 9:
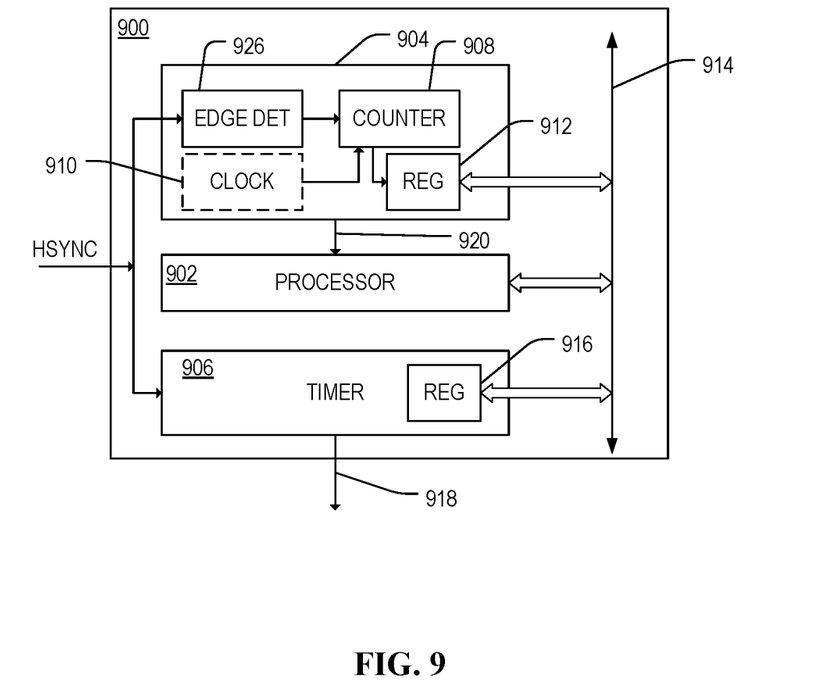
FIG. 9 is a block diagram of a circuit for controlling a display according to some embodiments.

FIG. 9 is a block diagram of a circuit 900 for controlling a display according to some embodiments. The circuit 900 may include a processor 902, a pulse measurement circuit 904, and a timer 906. The processor 902 may be a microcontroller coupled to the pulse measurement circuit 904. The pulse measurement circuit 904 may include an edge detection circuit 926, a counter 908, and a register 912. The edge detection circuit 926 may receive an HSYNC signal and may be configured to detection an edge of the HSYNC signal. The counter is coupled to an optional clock 910. The clock 910 may be a high frequency clock. The clock 910 may be a clock located within the pulse measurement circuit 904 as shown in FIG. 9. Alternatively, the clock 910 may be located outside of the pulse measurement circuit 904 or even outside of the circuit 900.

The pulse measurement circuit may be configured to measure a pulse period of the HSYNC signal. For example, in one embodiment, the edge detection circuit 926 may detect a rising edge of the HSYNC signal and start the counter 908. The counter 908 may be driven by the clock 910 and may increment per clock cycle. When the edge detection circuit 926 detects a subsequent rising edge of the HSYNC signal, it may stop the counter 908. Any suitable measurement hardware and techniques known in the art may be implemented in the pulse measurement circuit 904. The pulse measurement circuit may store the measured pulse period in the register 912 and transmit a service interrupt 920 to the processor 902. Once receiving the service interrupt 920, the processor 902 may read the measured pulse period from the register 912 and determine a duration for the timer 906 based on the measured pulse period and a predetermined number as described above. The processor 902 may write the duration into a register 916 of the timer 906. The processor 902 may communicate with the register 912 and the register 916 via a communication bus 914. The timer 906 may start at the beginning of a frame. The timer 906 may determine the beginning of the frame upon detection a beginning HSYNC pulse during the frame. When the timer 906 expires, it may transmit a signal 918 to initiate a touch scan on a touch sensing panel of the display.

In various embodiments, pulse measurement circuit 904 and timer 906 may be implemented using digital logic circuits known in the art. As non-limiting examples, edge detector 906 may be implemented using a register and state machine, counter 908 and timer 906 may be implemented using counter circuits known in the art, such as synchronous counters, clock circuit 910 may be implemented using an oscillator circuit, and registers 912 and 916 may be implemented using register circuits known in the art. Circuit 900 may also be physically implemented using digital circuit design techniques known in the art including digital synthesis techniques. The digital logic circuits of circuit 900 may include custom digital logic, standard cell digital, and programmable digital logic.

In an embodiment, the circuit 900 may be a touch controller of the display. In another embodiment, the circuit 900 may be located within the touch controller. In yet another embodiment, the circuit may be an external circuit coupled to the touch controller.

Example embodiments of the invention are summarized here. Other embodiments can also be understood from the entirety of the specification as well as the claims filed herein.

Example 1. A method for operating a display, the method comprising: receiving a horizontal synchronization (HSYNC) signal from a display driver of the display, the HSYNC signal including a plurality of pulses; measuring a parameter of the HSYNC signal within a frame; and initiating a touch scan on a touch sensing panel of the display based on the measured parameter.

Example 2. The method of Example 1, further comprising: starting a timer upon detecting a beginning pulse of the HSYNC signal within the frame, wherein the parameter is a pulse period of the HSYNC signal within the frame, wherein a duration of the timer is longer than the measured pulse period multiplied by a predetermined number associated with a resolution of the display; and wherein the touch scan is initiated upon detecting an expiration of the timer.

Example 3. The methods of Example 1 and Example 2, further comprising: determining an operation mode of the display in accordance with the measured pulse period, the operation mode belonging to a plurality of operation modes including a high speed mode and a normal speed mode; and selecting the duration of the timer from a plurality of predetermined values in accordance with the operation mode, each of the plurality of predetermined values being associated with one of the plurality of operation modes.

Example 4. The methods of Example 1 through Example 3, wherein the pulse period of the HSYNC signal is an interval between either rising edges of two consecutive pulses of the HSYNC signal or falling edges of the two consecutive pulses of the HSYNC signal.

Example 5. The methods of Example 1 through Example 4, wherein the pulse period of the HSYNC signal is determined in accordance with a pulse width of the HSYNC signal and a duty cycle, the pulse width being an interval between a rising edge of a pulse of the HSYNC signal and a falling edge of the pulse of the HSYNC signal.

Example 6. The methods of Example 1 through Example 5, wherein measuring the parameter of the HSYNC signal within the frame includes counting the plurality of pulses of the HSYNC signal within the frame, and wherein the touch scan is initiated after a predetermined number of pulses of the HSYNC signal has occurred, the predetermined number of pulses being associated with a resolution of the display.

Example 7. The methods of Example 1 through Example 6, wherein counting the plurality of pulses of the HSYNC signal within the frame includes: initializing a counter at a beginning of the frame; and incrementing the counter each time a pulse of the HSYNC signal is detected during the frame.

Example 8. The methods of Example 1 through Example 7, further comprising: starting a timer upon determining that the counter reaches the predetermined number, wherein the touch scan is initiated upon detecting an expiration of the timer.

Example 9. The methods of Example 1 through Example 8, wherein the parameter is measured by a pulse measurement circuit, and wherein the pulse measurement circuit includes a counter and an edge detection circuit coupled together, the counter further coupled to a high frequency clock.

Example 10. The methods of Example 1 through Example 9, wherein the touch scan is initiated by a timer coupled to the pulse measurement circuit through a processor.

Example 11. A circuit for controlling a display, the circuit comprising: a processor, a pulse measurement circuit coupled to the processor, the pulse measurement circuit configured to measure a parameter of a horizontal synchronization (HSYNC) signal within a frame, the HSYNC signal including a plurality of pulses and being received from a display driver of the display, and a timer coupled to the processor and configured to initiate a touch scan on a touch sensing panel of the display based on the measured parameter.

Example 12. The circuit of Example 11, wherein the parameter is a pulse period of the HSYNC signal within the frame, and wherein the pulse measurement circuit includes an edge detection circuit and a counter coupled together, the counter further coupled to a high frequency clock.

Example 13. The circuits of Example 11 and Example 12, wherein the timer is configured to start upon detecting a beginning pulse of the HSYNC signal within the frame, wherein a duration of the timer is longer than the measured pulse period multiplied by a predetermined number associated with a resolution of the display; and wherein the timer is configured to initiate the touch scan upon an expiration.

Example 14. The circuits of Example 11 through Example 13, wherein the processor is configured to: determine an operation mode of the display in accordance with the measured pulse period, the operation mode belonging to a plurality of operation modes including a high speed mode and a normal speed mode; and select a duration of the timer from a plurality of predetermined values in accordance with the operation mode, each of the plurality of predetermined values being associated with one of the plurality of operation modes.

Example 15. The circuits of Example 11 through Example 14, wherein the pulse measurement circuit is configured to transmit an interrupt signal to the processor upon determining the pulse period, and wherein the processor is configured to set the duration for the timer upon receiving the interrupt signal.

Example 16. The circuits of Example 11 through Example 15, wherein the processor is configured to read the measured pulse period from the pulse measurement circuit and write the duration for the timer through a communication bus.

Example 17. The circuits of Example 11 through Example 16, wherein the pulse period of the HSYNC signal is an interval between either rising edges of two consecutive pulses of the HSYNC signal or falling edges of the two consecutive pulses of the HSYNC signal.

Example 18. The circuits of Example 11 through Example 17, wherein the pulse period of the HSYNC signal is determined in accordance with a pulse width of the HSYNC signal and a duty cycle, the pulse width being an interval between a rising edge of a pulse of the HSYNC signal and a falling edge of the pulse of the HSYNC signal.

Example 19. The circuits of Example 11 through Example 18, wherein the pulse measurement circuit is configured to count the plurality of pulses of the HSYNC signal within the frame, and wherein the pulse measurement circuit includes an edge detection circuit and a counter.

Example 20. The circuits of Example 11 through Example 19, wherein the timer is configured to start upon determining that a predetermined number of pulses of the HSYNC signal has occurred, the predetermined number of pulses being associated with a resolution of the display, and wherein the timer is configured to initiate the touch scan upon an expiration.

Example 21. The circuits of Example 11 through Example 20, wherein the circuit is either located within a touch controller of the display or an external circuit coupled to the touch controller, and wherein the touch controller is configured to control a touch sensing panel of the display.

Example 22. A device comprising: a display including a display panel and a touch sensing panel, a display driver configured to control the display panel, and a touch controller including: a processor, a pulse measurement circuit coupled to the processor, the pulse measurement circuit including an edge detection circuit and a counter and being configured to measure a parameter of a horizontal synchronization (HSYNC) signal within a frame, the HSYNC signal including a plurality of pulses and being received from the display driver, and a timer coupled to the processor and configured to initiate a touch scan on the touch sensing panel based on the measured parameter.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method for operating a display, the method comprising:
   receiving a horizontal synchronization (HSYNC) signal from a display driver of the display, the HSYNC signal including a plurality of pulses;
   measuring a parameter of the HSYNC signal within a frame; initiating a touch scan on a touch sensing panel of the display based on the measured parameter; and
   starting a timer upon detecting a beginning pulse of the HSYNC signal within the frame,
   wherein the parameter is a pulse period of the HSYNC signal within the frame,
   wherein a duration of the timer is longer than the measured pulse period multiplied by a predetermined number associated with a resolution of the display, and
   wherein the touch scan is initiated upon detecting an expiration of the timer.

2. The method of claim 1, further comprising:
   determining an operation mode of the display in accordance with the measured pulse period, the operation mode belonging to a plurality of operation modes including a high speed mode and a normal speed mode; and
   selecting the duration of the timer from a plurality of predetermined values in accordance with the operation mode, each of the plurality of predetermined values being associated with one of the plurality of operation modes.

3. The method of claim 1, wherein the pulse period of the HSYNC signal is an interval between either rising edges of two consecutive pulses of the HSYNC signal or falling edges of the two consecutive pulses of the HSYNC signal.

4. The method of claim 1, wherein the pulse period of the HSYNC signal is determined in accordance with a pulse width of the HSYNC signal and a duty cycle, the pulse width being an interval between a rising edge of a pulse of the HSYNC signal and a falling edge of the pulse of the HSYNC signal.

5. The method of claim 1,
   wherein the parameter is measured by a pulse measurement circuit, and
   wherein the pulse measurement circuit includes a counter and an edge detection circuit coupled together, the counter further coupled to a high frequency clock.

6. The method of claim 5, wherein the touch scan is initiated by a timer coupled to the pulse measurement circuit through a processor.

7. A circuit for controlling a display, the circuit comprising:
   a processor,
   a pulse measurement circuit coupled to the processor, the pulse measurement circuit configured to measure a parameter of a horizontal synchronization (HSYNC) signal within a frame, the HSYNC signal including a plurality of pulses and being received from a display driver of the display, and a timer coupled to the processor and configured to initiate a touch scan on a touch sensing panel of the display based on the measured parameter, wherein the parameter is a pulse period of the HSYNC signal within the frame, and wherein the pulse measurement circuit includes an edge detection circuit and a counter coupled together, the counter further coupled to a high frequency clock, wherein the timer is configured to start upon detecting a beginning pulse of the HSYNC signal within the frame, wherein a duration of the timer is longer than the measured pulse period multiplied by a predetermined number associated with a resolution of the display, and wherein the timer is configured to initiate the touch scan upon an expiration.

8. The circuit of claim 7, wherein the processor is configured to:
determine an operation mode of the display in accordance with the measured pulse period, the operation mode belonging to a plurality of operation modes including a high speed mode and a normal speed mode; and
select a duration of the timer from a plurality of predetermined values in accordance with the operation mode, each of the plurality of predetermined values being associated with one of the plurality of operation modes.

9. The circuit of claim 8,
wherein the pulse measurement circuit is configured to transmit an interrupt signal to the processor upon determining the pulse period, and
wherein the processor is configured to set the duration for the timer upon receiving the interrupt signal.

10. The circuit of claim 9, wherein the processor is configured to read the measured pulse period from the pulse measurement circuit and write the duration for the timer through a communication bus.

11. The circuit of claim 7, wherein the pulse period of the HSYNC signal is an interval between either rising edges of two consecutive pulses of the HSYNC signal or falling edges of the two consecutive pulses of the HSYNC signal.

12. The circuit of claim 7, wherein the pulse period of the HSYNC signal is determined in accordance with a pulse width of the HSYNC signal and a duty cycle, the pulse width being an interval between a rising edge of a pulse of the HSYNC signal and a falling edge of the pulse of the HSYNC signal.

13. The circuit of claim 7,
wherein the circuit is either located within a touch controller of the display or an external circuit coupled to the touch controller, and
wherein the touch controller is configured to control a touch sensing panel of the display.

14. A device comprising:
a display including a display panel and a touch sensing panel,
a display driver configured to control the display panel, and
a touch controller including:
a processor,
a pulse measurement circuit coupled to the processor, the pulse measurement circuit including an edge detection circuit and a counter and being configured to measure a parameter of a horizontal synchronization (HSYNC) signal within a frame, the HSYNC signal including a plurality of pulses and being received from the display driver, and
a timer coupled to the processor and configured to initiate a touch scan on the touch sensing panel based on the measured parameter, wherein the parameter is a pulse period of the HSYNC signal within the frame, and wherein the pulse measurement circuit includes an edge detection circuit and a counter coupled together, the counter further coupled to a high frequency clock, wherein the timer is configured to start upon detecting a beginning pulse of the HSYNC signal within the frame, wherein a duration of the timer is longer than the measured pulse period multiplied by a predetermined number associated with a resolution of the display, and wherein the timer is configured to initiate the touch scan upon an expiration.

15. The device of claim 14, wherein the processor is configured to:
determine an operation mode of the display in accordance with the measured pulse period, the operation mode belonging to a plurality of operation modes including a high speed mode and a normal speed mode; and
select a duration of the timer from a plurality of predetermined values in accordance with the operation mode, each of the plurality of predetermined values being associated with one of the plurality of operation modes.

16. The device of claim 15,
wherein the pulse measurement circuit is configured to transmit an interrupt signal to the processor upon determining the pulse period, and
wherein the processor is configured to set the duration for the timer upon receiving the interrupt signal.

17. The device of claim 16, wherein the processor is configured to read the measured pulse period from the pulse measurement circuit and write the duration for the timer through a communication bus.

18. The device of claim 14, wherein the pulse period of the HSYNC signal is an interval between either rising edges of two consecutive pulses of the HSYNC signal or falling edges of the two consecutive pulses of the HSYNC signal.

19. The device of claim 14, wherein the pulse period of the HSYNC signal is determined in accordance with a pulse width of the HSYNC signal and a duty cycle, the pulse width being an interval between a rising edge of a pulse of the HSYNC signal and a falling edge of the pulse of the HSYNC signal.

* * * * *

UNITED STATES PATENT AND TRADEMARK OFFICE
CERTIFICATE OF CORRECTION

PATENT NO. : 11,822,746 B1
APPLICATION NO. : 17/870980
DATED : November 21, 2023
INVENTOR(S) : Kim et al.

It is certified that error appears in the above-identified patent and that said Letters Patent is hereby corrected as shown below:

On the Title Page

Item (72), in Column 1, in "Inventors", Line 1, delete "Bakdal-dong" and insert -- Bakdal 1-dong --.

Signed and Sealed this
Fifth Day of March, 2024

Katherine Kelly Vidal
*Director of the United States Patent and Trademark Office*